United States Patent
Konami et al.

(10) Patent No.: US 10,899,856 B2
(45) Date of Patent: Jan. 26, 2021

(54) MOLDING MATERIAL, SHEET MOLDING COMPOUND AND FIBER-REINFORCED COMPOSITE MATERIAL

(71) Applicant: Mitsubishi Chemical Corporation, Chiyoda-ku (JP)

(72) Inventors: Yukichi Konami, Tokyo (JP); Seiji Tsuchiya, Tokyo (JP); Yuji Kazehaya, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 38 days.

(21) Appl. No.: 16/151,548

(22) Filed: Oct. 4, 2018

(65) Prior Publication Data

US 2019/0040163 A1 Feb. 7, 2019

Related U.S. Application Data

(63) Continuation of application No. PCT/JP2017/016570, filed on Apr. 26, 2017.

(30) Foreign Application Priority Data

May 13, 2016 (JP) .................................. 2016-097267

(51) Int. Cl.

| | |
|---|---|
| *C08F 12/08* | (2006.01) |
| *C08J 5/04* | (2006.01) |
| *C08J 5/24* | (2006.01) |
| *C08F 283/01* | (2006.01) |
| *C08G 18/79* | (2006.01) |
| *C08G 18/68* | (2006.01) |
| *C08F 2/44* | (2006.01) |
| *C08G 18/22* | (2006.01) |
| *C08J 5/10* | (2006.01) |
| *C08K 3/10* | (2018.01) |
| *C08K 3/11* | (2018.01) |
| *C08K 3/04* | (2006.01) |
| *C08K 7/02* | (2006.01) |
| *C08F 20/18* | (2006.01) |
| *C08F 20/32* | (2006.01) |

(Continued)

(52) U.S. Cl.

CPC ............... *C08F 12/08* (2013.01); *C08F 2/44* (2013.01); *C08F 20/18* (2013.01); *C08F 20/32* (2013.01); *C08F 283/01* (2013.01); *C08G 18/222* (2013.01); *C08G 18/68* (2013.01); *C08G 18/797* (2013.01); *C08J 5/04* (2013.01); *C08J 5/10* (2013.01); *C08J 5/24* (2013.01); *C08K 3/04* (2013.01); *C08K 3/10* (2013.01); *C08K 3/11* (2018.01); *C08K 5/56* (2013.01); *C08K 7/02* (2013.01); *C08F 220/305* (2020.02); *C08J 2363/02* (2013.01); *C08J 2363/10* (2013.01); *C08J 2367/06* (2013.01); *C08J 2375/04* (2013.01)

(58) Field of Classification Search

CPC ...... C08F 218/08; C08F 283/01; C08F 12/08; C08F 20/32; C08F 2/44; C08J 5/24; C08J 5/04; C08J 5/10; C08J 5/18; C08J 2363/00; C08J 2363/10; C08J 2367/06; C08J 5/19; C08G 18/222; C08G 18/68; C08G 18/755; C08G 18/7621; C08L 75/06; C08K 3/013; C08K 7/02

USPC .............................................. 428/297.4, 457

See application file for complete search history.

(56) References Cited

U.S. PATENT DOCUMENTS

| | | |
|---|---|---|
| 3,956,211 A | 5/1976 | Muto et al. |
| 5,235,010 A | 8/1993 | Giovando |
| 2017/0298199 A1 | 10/2017 | Akiyama et al. |

FOREIGN PATENT DOCUMENTS

| | | |
|---|---|---|
| GB | 1337 131 A | 11/1973 |
| GB | 2 304 122 | 3/1997 |

(Continued)

OTHER PUBLICATIONS

International Search Report dated Jul. 11, 2017 in PCT/JP2017/016570 filed Apr. 26, 2017 (with English Translation).

(Continued)

*Primary Examiner* — Camie S Thompson

(74) *Attorney, Agent, or Firm* — Oblon, McClelland, Maier & Neustadt, L.L.P.

(57) ABSTRACT

The present invention provides a SMC of which excessive thickening with time is suppressed while of which sufficient initial thickening by an isocyanate-based thickener is maintained, particularly of which a decrease in flowability at the time of molding to be easily actualized in the case of containing an aromatic vinyl compound such as styrene is suppressed, and which exhibits excellent storage stability and moldability, a molding material for obtaining the SMC, and a fiber-reinforced composite material using the SMC. The invention provides a molding material including: a matrix resin composition containing the following Component (A), the following Component (B), the following Component (D) and the following Component (E); and the following Component (C), in which a proportion of the Component (E) with respect to 100 parts by mass of a sum of the Component (A) and the Component (B) is 0.002 part by mass or more and 0.08 part by mass or less:

Component (A): a compound having either or both of a hydroxyl group and a carboxyl group and a polymerizable unsaturated group, Component (B): an aromatic vinyl compound, Component (C): a reinforcing fiber bundle having a fiber length of 5 mm or more and 120 mm or less, Component (D): an isocyanate compound, and Component (E): a metal chelate compound.

20 Claims, No Drawings

(51) Int. Cl.
*C08K 5/56* (2006.01)
*C08F 220/30* (2006.01)

(56) References Cited

FOREIGN PATENT DOCUMENTS

| JP | 48-038390 | 6/1973 |
|----|-----------|--------|
| JP | 49-031790 | 3/1974 |
| JP | 53-041390 | 4/1978 |
| JP | 53-088874 | 8/1978 |
| JP | 63-039008 | 8/1988 |
| JP | 04-507424 | 12/1992 |
| JP | 08-150619 | 6/1996 |
| JP | 09-169862 | 6/1997 |
| JP | 10-110048 | 4/1998 |
| JP | 10-120736 | 5/1998 |
| JP | 11-147221 | 6/1999 |
| JP | 11-147222 | 6/1999 |
| JP | 2001-011200 | 1/2001 |
| JP | 2004-231848 | 8/2004 |
| JP | 2004-231862 | 8/2004 |
| WO | WO 84/00173 A1 | 1/1984 |
| WO | WO 2015/133289 A1 | 9/2015 |
| WO | WO 2016/039326 A1 | 3/2016 |

OTHER PUBLICATIONS

Written Opinion dated Jul. 11, 2017 in PCT/JP2017/016570 filed Apr. 26, 2017.
Office Action dated Jan. 23, 2018 in Japanese Patent Application 2017-527382 (with English Translation).
Tris(2,4-pentanedionato)iron(III), Tokyo Kasei Kogyo Co., Ltd., Oct. 4, 2013, http://www.tcichemicals.com/eshop/ja/jp/commodity/l0079/.
Extended European Search Report dated Apr. 1, 2019 in Patent Application No. 17795968.1, 4 pages.
Office Action issued in CN Application No. 201780028504.6, dated Sep. 3, 2020 w/Machine translation obtained by Global Dossier on Oct. 8, 2020.

MOLDING MATERIAL, SHEET MOLDING COMPOUND AND FIBER-REINFORCED COMPOSITE MATERIAL

The present application is a continuation application of International application No. PCT/JP2017/016570, filed on Apr. 26, 2017, which claims the priority from Japanese Patent Application No. 2016-097267 filed in Japan on May 13, 2016, the entire contents of which are incorporated herein by reference.

TECHNICAL FIELD

The present invention relates to a molding material, a sheet molding compound and a fiber-reinforced composite material.

BACKGROUND ART

Hitherto, fiber-reinforced composite materials containing a matrix resin composition, a reinforcing fiber, a filler and the like have been widely utilized in members for electrical and electronic machinery and apparatuses, building materials, members for vehicles, and the like since the fiber-reinforced composite materials can impart mechanical strength in addition to easy processability, non-corrosive property and lightweight property of plastics. Fiber-reinforced composite materials are manufactured by various methods, and for example, a method in which a prepreg, which is a reinforcing fiber base material impregnated with a matrix resin composition, is fabricated in advance and this is laminated, heated and cured is widely used.

Meanwhile, a sheet molding compound (hereinafter referred to as SMC) is widely used in the manufacture of a molded article which has a complicated shape with fine irregularities and is hardly fabricated by molding using a prepreg. A SMC can cope with a fine irregular shape of the die since reinforcing fibers having a shorter fiber length than reinforcing fibers to be used in a prepreg are generally used in the SMC and the SMC easily flows in the molding die at the time of molding. As the SMC, for example, one containing a reinforcing fiber having a short fiber length and a curable resin composition containing a thermosetting compound represented by an unsaturated polyester, epoxy acrylate or the like is known (for example, Patent Literatures 1 to 6).

CITATION LIST

Patent Literature

Patent Literature 1: JP 11-147222 A
Patent Literature 2: JP 10-110048 A
Patent Literature 3: JP 10-120736 A
Patent Literature 4: JP 11-147221 A
Patent Literature 5: JP 9-169862 A
Patent Literature 6: JP 2004-231848 A

SUMMARY OF THE INVENTION

Problem to be Solved by the Invention

Thickeners are often used for the purpose of improving the handling property of SMC before being used in molding. As the thickener, for example, an isocyanate-based thickener is used in the case of containing the thermosetting compound containing a hydroxyl group, a carboxyl group or the like such as an unsaturated polyester or epoxy acrylate. It is possible to easily thicken a SMC and to obtain a SMC exhibiting excellent handling property by use of an isocyanate-based thickener. However, a problem arises that the flowability at the time of molding and the moldability decrease along with the passage of time in the case of a SMC containing an aromatic vinyl compound such as styrene.

Incidentally, a curing accelerator is often used in a SMC at about 0.001 part by mass or more and 5 parts by mass or less with respect to 100 parts by mass of the curable compound (curable resin, curable monomer or the like) in order to accelerate the curing reaction at the time of molding (Patent Literatures 1 to 6). As the curing accelerator, for example, a metal chelate compound such as iron(III) acetylacetonate is known. However, in the prior art, excessive thickening with time when a curing accelerator is blended in the case of thickening a SMC using an isocyanate-based thickener and the effect of suppressing a decrease in flowability of the SMC at the time of molding have not been considered.

An object of the invention is to provide a SMC of which excessive thickening with time is suppressed while of which sufficient initial thickening by an isocyanate-based thickener is maintained, particularly of which a decrease in flowability at the time of molding to be easily actualized in the case of containing an aromatic vinyl compound such as styrene is suppressed, and which exhibits excellent storage stability and moldability, a molding material for obtaining the SMC, and a fiber-reinforced composite material using the SMC.

Means for Solving the Problem

The invention provides a molding material, a SMC, and a fiber-reinforced composite material which have the following configurations.

[1] A molding material containing: a matrix resin composition containing the following Component (A), the following Component (B), the following Component (D) and the following Component (E); and
the following Component (C), in which
a proportion of the Component (E) with respect to 100 parts by mass of a sum of the Component (A) and the Component (B) is 0.002 part by mass or more and 0.08 part by mass or less:
Component (A): a compound having either or both of a hydroxyl group and a carboxyl group and a polymerizable unsaturated group,
Component (B): an aromatic vinyl compound,
Component (C): a reinforcing fiber bundle having a fiber length of 5 mm or more and 120 mm or less,
Component (D): an isocyanate compound, and
Component (E): a metal chelate compound.
[2] The molding material according to [1], in which the Component (B) is styrene.
[3] The molding material according to [1] or [2], in which the Component (A) is an unsaturated polyester or epoxy (meth)acrylate.
[4] The molding material according to [1] or [2], in which the Component (A) is an unsaturated polyester and epoxy (meth)acrylate.
[5] The molding material according to any one of [1] to [4], in which the Component (C) is a carbon fiber bundle.
[6] The molding material according to any one of [1] to [5], in which the Component (E) is at least one or more kinds of metal chelate compounds selected from the group consisting of a titanium chelate compound, a manganese chelate compound, an iron chelate compound, a nickel chelate compound, a copper chelate compound, a zirconium chelate compound, a tin chelate compound, and a bismuth chelate compound.

[7] The molding material according to any one of [1] to [6], in which the Component (E) is an iron chelate compound or a titanium chelate compound.

[8] The molding material according to [7], in which the iron chelate compound is iron(III) acetylacetonate.

[9] The molding material according to any one of [1] to [8], further containing Component (F): a polymerization initiator.

[10] A sheet molding compound containing: a thickened product of a matrix resin composition containing the following Component (A), the following Component (B), the following Component (D) and the following Component (E); and the following Component (C), in which a proportion of the Component (E) with respect to 100 parts by mass of a sum of the Component (A) and the Component (B) is 0.002 part by mass or more and 0.08 part by mass or less:

Component (A): a compound having either or both of a hydroxyl group and a carboxyl group and a polymerizable unsaturated group, Component (B): an aromatic vinyl compound, Component (C): a reinforcing fiber bundle having a fiber length of 5 mm or more and 120 mm or less, Component (D): an isocyanate compound, and Component (E): a metal chelate compound.

[11] A fiber-reinforced composite material containing a cured product of the sheet molding compound according to [10].

Effect of the Invention

When the molding material of the invention is used, a SMC is obtained of which excessive thickening with time and a decrease in flowability at the time of molding are suppressed while of which sufficient initial thickening by an isocyanate-based thickener is maintained and which exhibits excellent storage stability and moldability.

Excessive thickening of the SMC of the invention with time and a decrease in flowability of the SMC at the time of molding are suppressed while sufficient initial thickening of the SMC by an isocyanate-based thickener is maintained, and the SMC exhibits excellent storage stability and moldability.

The fiber-reinforced composite material of the invention is easily molded since such a SMC is used therein.

Mode(s) for Carrying Out the Invention

In the present specification, the "polymerizable unsaturated group" is an unsaturated group which reacts at the time of radical polymerization, and examples thereof may include a vinyl group, a vinyl ether group, a vinyl ester group, an allyl group, an allyl ether group, an allyl ester group, an acryloyl group, and a methacryloyl group.

The "aromatic vinyl compound" is a compound having a structure in which a hydrogen atom of a cyclic unsaturated hydrocarbon is substituted with a vinyl group.

"Epoxy (meth)acrylate" refers to epoxy acrylate and epoxy methacrylate.

[Molding Material]

The molding material of the invention is a composition which contains a matrix resin composition containing Component (A), Component (B), Component (D) and Component (E) to be described later and Component (C) as essential components. Incidentally, the molding material of the invention may contain components other than Component (A) to Component (E).

[Matrix Resin Composition]

The matrix resin composition contains Component (A), Component (B), Component (D) and Component (E).

(Component (A))

Component (A) is a compound which has either or both of a hydroxyl group and a carboxyl group and a polymerizable unsaturated group and excluding Component (B). The molding material thickens and becomes a SMC as the isocyanate group of Component (D) reacts with the hydroxyl group or carboxyl group of Component (A). As Component (A), the following Component (A1), Component (A2), or a combination thereof is preferable. As Component (A), one kind may be used singly or two or more kinds may be used in combination.

(A1) An unsaturated polyester having either or both of a hydroxyl group and a carboxyl group.

(A2) Epoxy (meth)acrylate having either or both of hydroxyl group and carboxyl group.

<Component (A1)>

Examples of Component (A1) may include unsaturated polyesters obtained by reacting dibasic acids including α,β-unsaturated dibasic acids with polyhydric alcohols and dicyclo-based unsaturated polyesters.

Examples of the α,β-unsaturated dibasic acids may include maleic acid, maleic anhydride, fumaric acid, itaconic acid, and itaconic anhydride. One kind of α,β-unsaturated dibasic acid may be used singly or two or more kinds thereof may be used in combination.

The dibasic acids may include other dibasic acids (hereinafter referred to as "other dibasic acids") in addition to the α,β-unsaturated dibasic acids. Examples of other dibasic acids may include 2,6-naphthalene dicarboxylic acid, phthalic acid, isophthalic acid, terephthalic acid, succinic acid, malonic acid, glutaric acid, adipic acid, pimelic acid, suberic acid, azelaic acid, sebacic acid, or anhydrides and halogenated anhydrides thereof. One kind of another dibasic acid may be used singly or two or more kinds of other dibasic acids may be used in combination.

Examples of the polyhydric alcohols may include ethylene glycol, diethylene glycol, triethylene glycol, tetramethylene glycol, polyethylene glycol, propylene glycol, 1,3-propanediol, dipropylene glycol, polypropylene glycol, polytetramethylene glycol, 2-methyl-1,3-propanediol, 2,2-dimethyl-1,3-propanediol, 1,3-butanediol, glycerin, trimethylolpropane, and 1,3-propanediol. As the polyhydric alcohols, one kind may be used singly or two or more kinds may be used in combination.

Examples of the dicyclo-based unsaturated polyester may include an unsaturated polyester obtained by further reacting a product obtained by dropping water on dicyclopentadiene and maleic anhydride and reacting these with a polyhydric alcohol and an unsaturated polyester obtained by reacting dicyclopentadiene with a product obtained by reacting an unsaturated dibasic acid with a polyhydric alcohol. As the dicyclo-based unsaturated polyester, one kind may be used singly or two or more kinds may be used in combination.

Unsaturated polyesters obtained by reacting dibasic acids including an α,β-unsaturated dibasic acid with polyhydric alcohols are preferable as Component (A1), particularly maleic acid and fumaric acid are preferable as the α,β-unsaturated dibasic acid, terephthalic acid, isophthalic acid, and 2,6-naphthalenedicarboxylic acid are preferable as other dibasic acids, and ethylene glycol, propylene glycol, dipropylene glycol, 1,3-propanediol and 2,2-dimethyl-1,3-propanediol are preferable as the polyhydric alcohol.

The mass average molecular weight of Component (A1) is preferably 500 or more and 50,000 or less and more preferably 1,000 or more and 20,000 or less. Incidentally, the mass average molecular weight is the mass average molecular weight in terms of standard polystyrene by GPC.

<Component (A2)>

Examples of Component (A2) may include the following Component (A21) and Component (A22). Component (A21) is more preferable from the viewpoint of reactivity with an isocyanate compound.

(A21) Epoxy (meth)acrylate obtained by reacting an epoxy resin component with (meth)acrylic acid.

(A22) Epoxy (meth)acrylate obtained by reacting an epoxy resin component with (meth)acrylic acid and then further reacting the product with a polybasic acid anhydride.

Component (A21):

Component (A21) has a hydroxyl group in the molecule.

Examples of the epoxy resin component may include a compound having at least two epoxy groups in one molecule. The compound may be aliphatic, alicyclic aliphatic or aromatic.

Specific examples of the epoxy resin component may include a diglycidyl ether type epoxy resin having a bisphenol compound (bisphenol A, bisphenol F, bisphenol S, brominated bisphenol A, or the like) as a main skeleton, a polyglycidyl ether type epoxy resin having a polynuclear phenol compound (phenol novolac, cresol novolac, brominated phenol novolac, or the like) as a main skeleton, a polyglycidyl ester type epoxy resin having an organic polybasic acid (dimer acid, trimellitic acid, or the like) as a main skeleton, and a glycidyl ether type epoxy resin having a diol compound (ethylene oxide adduct of bisphenol A, propylene oxide adduct of bisphenol A, glycol, hydrogenated bisphenol A, hydrogenated bisphenol F, or the like) as a main skeleton. Among these, bisphenol A diglycidyl ether and diglycidyl ether of propylene oxide adduct of bisphenol A are preferable.

One kind of epoxy resin component may be used singly or two or more kinds thereof may be used in combination.

In Component (A21), only either of acrylic acid or methacrylic acid may be used or both of acrylic acid and methacrylic acid may be used.

Examples of commercially available products of Component (A21) may include "EPDXY ESTER 3002M" and "EPDXY ESTER 3000M" (trade names, all manufactured by Kyoeisha Chemical Co., Ltd.). Examples of commercially available products in which Component (A21) is blended with Component (B) such as styrene as a reactive diluent may include "NEOPOL 8051" and "NEOPOL 8101" (trade names, all manufactured by Japan U-Pica Company Ltd.). As Component (A21), one kind may be used singly or two or more kinds may be used in combination.

Component (A22):

Component (A22) has a carboxyl group in the molecule.

Examples of the epoxy resin component in Component (A22) may include the same epoxy resin components as those exemplified in Component (A21).

Examples of the polybasic acid anhydride may include maleic anhydride, phthalic anhydride, itaconic anhydride, citraconic anhydride, tetrahydrophthalic anhydride, tetrabromophthalic anhydride, trimellitic anhydride, and 3,6-endomethylene-1,2,3,6-tetrahydrophthalic anhydride. One kind of polybasic acid anhydride may be used singly or two or more kinds thereof may be used in combination.

In Component (A22), only either of acrylic acid or methacrylic acid may be used or both of acrylic acid and methacrylic acid may be used. As Component (A22), one kind may be used singly or two or more kinds may be used in combination.

The mass average molecular weight of Component (A2) is preferably 200 or more and 17,000 or less and more preferably 500 or more and 6,000 or less. Incidentally, as Component (A2), Component (A21) is more preferable from the viewpoint of impregnating ability into the carbon fiber bundle.

<Component (A3)>

As Component (A), Component (A3) other than Component (A1) and Component (A2) may be used. Examples of Component (A3) may include the following Component (A31) and Component (A32). Component (A31) is more preferable from the viewpoint of reactivity with an isocyanate compound.

(A31) An unsaturated acid epoxy ester obtained by reacting an epoxy resin component with an unsaturated group monobasic acid component other than (meth)acrylic acid.

(A32) An unsaturated acid epoxy ester obtained by reacting an epoxy resin component with an unsaturated group monobasic acid component other than (meth)acrylic acid and then further reacting the product with a polybasic acid anhydride.

Examples of the epoxy resin component in Component (A31) may include the same epoxy resin components as those exemplified in Component (A2). The mass average molecular weight of Component (A31) is preferably 600 or more and 20,000 or less and more preferably 800 or more and 6,000 or less.

Examples of the epoxy resin component in Component (A32) may include the same epoxy resin components as those exemplified in Component (A2). Examples of the unsaturated group monobasic acid component other than (meth)acrylic acid in Component (A32) may include monobasic acid having a polymerizable unsaturated group such as crotonic acid or sorbic acid. One kind of unsaturated group monobasic acid component may be used singly or two or more kinds thereof may be used in combination.

The mass average molecular weight of Component (A32) is preferably 800 or more and 22,000 or less and more preferably 1,200 or more and 6,000 or less.

As Component (A3), one kind may be used singly or two or more kinds may be used in combination.

(Component (B))

Component (B) is an aromatic vinyl compound. Component (B) is not particularly limited, and examples thereof may include the following compounds.

Alkylstyrenes such as styrene, vinyltoluene, p-methylstyrene, p-ethylstyrene, p-propylstyrene, p-isopropylstyrene, p-butylstyrene, p-tert-butylstyrene, o-methylstyrene, o-ethylstyrene, o-propylstyrene, o-isopropylstyrene, m-methylstyrene, m-ethylstyrene, m-propylstyrene, m-isopropylstyrene, m-butylstyrene, mesitylstyrene, 2,4-dimethylstyrene, 2,5-dimethylstyrene, 3,5-dimethylstyrene, and 4-butenylstyrene, halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene, alkoxystyrenes such as p-methoxystyrene, o-methoxystyrene, and m-methoxystyrene, and styrene-based compounds such as hydroxystyrene, cyanostyrene, and vinylbenzoic acid ester.

Divinylbenzene-based compounds such as 1,3-divinylbenzene, 1,4-divinylbenzene, 1,3-diisopropenylbenzene, and 1,4-diisopropenylbenzene.

As Component (B), one kind may be used singly or two or more kinds may be used in combination.

Among these, it is preferable to use one selected from styrene, vinyltoluene, or divinylbenzene as Component (B) since the heat resistance of the cured product of the molding material of the invention tends to be improved.

Furthermore, it is more preferable that Component (B) is styrene since the effect of maintaining the flowability of the SMC to be described later is remarkable.

In addition, the matrix resin composition to be contained in the molding material of the invention can contain a compound having a polymerizable unsaturated group other than Components (A) and (B) described above as Component (H).

(Component (H))

As Component (H), for example, the following compounds can be used.

(Meth)acrylates such as methyl (meth)acrylate, ethyl (meth)acrylate, propyl (meth)acrylate, n-butyl (meth)acrylate, t-butyl (meth)acrylate, isobutyl (meth)acrylate, 2-ethylhexyl (meth)acrylate, n-nonyl (meth)acrylate, cyclohexyl (meth)acrylate, benzyl (meth)acrylate, dicyclopentanyl (meth)acrylate, dicyclopentenyl (meth)acrylate, 2-dicyclopentenoxyethyl (meth)acrylate, isobornyl (meth)acrylate, methoxyethyl (meth)acrylate, ethoxyethyl (meth)acrylate, butoxyethyl (meth)acrylate, methoxyethoxyethyl (meth)acrylate, ethoxyethoxyethyl (meth)acrylate, tetrahydrofurfuryl (meth)acrylate, lauryl (meth)acrylate, phenoxyethyl (meth)acrylate, p-cumyl phenol ethylene oxide-modified (meth)acrylate, and (meth)acryloyl morpholine.

Hydroxyalkyl (meth)acrylates such as 2-hydroxyethyl (meth)acrylate, 2-hydroxypropyl (meth)acrylate, 3-hydroxypropyl (meth)acrylate, and 4-hydroxybutyl (meth)acrylate.

(Meth)acrylates such as ethylene glycol di(meth)acrylate, 1,4 butanediol di(meth)acrylate, tricyclodecane di(meth)acrylate, polybutylene glycol di(meth)acrylate, EO-modified bisphenol A di(meth)acrylate, hydroxypivalic acid neopentyl glycol di(meth)acrylate, and caprolactone-modified hydroxypivalic acid neopentyl glycol di(meth)acrylate.

(Meth)acrylates such as trimethylolpropane tri(meth)acrylate, EO-modified trimethylolpropane tri(meth)acrylate, PO-modified trimethylolpropane tri(meth)acrylate, caprolactone-modified trimethylolpropane tri(meth)acrylate, tris (meth)acryloxyethyl isocyanurate, and caprolactone-modified tris(meth)acryloxyethyl isocyanurate.

(Meth)acrylates such as pentaerythritol tetra(meth)acrylate and pentaerythritol ethoxy tetra(meth)acrylate.

(Meth)acrylates such as dipentaerythritol hexa(meth)acrylate, EO-modified dipentaerythritol hexa(meth)acrylate, PO-modified dipentaerythritol hexa(meth)acrylate, and caprolactone-modified dipentaerythritol hexa(meth)acrylate.

Hydroxyl group-containing vinyl monomers such as an adduct of 2-hydroxyethyl (meth)acrylate and ethylene oxide, an adduct of 2-hydroxyethyl (meth)acrylate and propylene oxide, adducts of 2-hydroxyethyl (meth)acrylate and organic lactones (ε-caprolactone and the like).

(Meth)acrylamide compounds such as N,N-dimethyl (meth)acrylamide and N,N-diethyl (meth)acrylamide.

Unsaturated carboxylic acids such as (meth)acrylic acid, itaconic acid, maleic acid, and fumaric acid.

Polymerizable unsaturated nitriles such as (meth)acrylonitrile.

Unsaturated carboxylic acid esters such as diethyl maleate, dibutyl maleate, diethyl fumarate, diethyl itaconate, and dibutyl itaconate.

Vinyl esters such as vinyl acetate and vinyl propionate.

Allyl compounds such as diallyl phthalate and triallyl isocyanurate.

Component (H) can be appropriately selected and used if necessary, and one kind may be used singly or two or more kinds may be used in combination.

(Component (D))

Component (D) is an isocyanate compound. The isocyanate compound functions as a thickener.

As the isocyanate compound, a known isocyanate compound to be used as a thickener can be used without particular limitation. Specific examples thereof may include monoisocyanate compounds (methyl isocyanate (MIC)), diisocyanate compounds (2,4-toluene diisocyanate, 2,6-toluene diisocyanate, 4,4'-diphenylmethane diisocyanate (MDI), isophorone diisocyanate (IPDI), hexamethylene diisocyanate (HDI), tolylene diisocyanate, xylene diisocyanate, tetramethylxylylene diisocyanate, and the like), and tri- or higher functional polyisocyanate compounds.

As Component (D), an isocyanate prepolymer which has an isocyanate group at the terminal and is obtained by the reaction of a polyether polyol or polyester polyol containing a hydroxyl group with a diisocyanate compound, and the like may be used. In addition, a modified product of an isocyanate compound may be used as Component (D). Specifically, carbodiimide-modified liquid MDI (one containing MDI, MDI carbodiimide, or MDI carbodiimide adduct as a main component) may be used. As Component (D), one kind may be used singly or two or more kinds may be used in combination.

(Component (E))

Component (E) is a metal chelate compound.

For example, a titanium chelate compound, a manganese chelate compound, an iron chelate compound, a nickel chelate compound, a copper chelate compound, a zirconium chelate compound, a tin chelate compound, and a bismuth chelate compound can be used as Component (E).

As Component (E), an iron chelate compound or a titanium chelate compound is preferable and an iron chelate compound is particularly preferable from the viewpoint of exhibiting an excellent effect of suppressing excessive thickening of the SMC with time while maintaining initial thickening of the SMC by Component (D) in the SMC manufacturing process to be described later and suppressing a decrease in flowability of the SMC to be obtained at the time of molding.

Examples of the iron chelate compound may include iron(III) acetylacetonate and tris(2,4-pentanedionato)iron (III). Among these, iron(III) acetylacetonate is preferable.

Examples of the titanium chelate compound may include tetrakis(2,4-pentanedionato)titanium(IV), titanium diisopropoxide bis(acetylacetonate), and titanium diisopropoxide bis(ethylacetoacetate).

As Component (E), one kind may be used singly or two or more kinds may be used in combination.

(Component (F))

The matrix resin composition preferably contains Component (F): a polymerization initiator.

The polymerization initiator is not particularly limited, and examples thereof may include organic peroxides such as 1,1-di(t-butylperoxy)cyclohexane, t-butylperoxy isopropyl carbonate, methyl ethyl ketone peroxide, t-butyl peroxybenzoate, benzoyl peroxide, dicumyl peroxide, and cumene hydroperoxide. As Component (F), one kind may be used singly or two or more kinds may be used in combination.

(Component (G))

Component (G) is a milled carbon fiber.

It is preferable that the matrix resin composition further contains Component (G): a milled carbon fiber in addition to Component (A), Component (B) and Component (D) to Component (F). It is possible to adjust a balance between the mechanical strength and the flowability and appearance by using Component (C) in combination with Component (G).

The milled carbon fiber which is Component (G) is a carbon fiber having a mass average fiber length of 210 μm or less. The content rate of the fiber having a fiber length of 350 μm or less in the milled carbon fiber (100% by mass) is preferably 85% by mass or more. The milled carbon fiber is likely to be dispersed in the molding material when the content rate is 85% by mass or more.

The milled carbon fiber can be fabricated, for example, by subjecting a carbon fiber to processing such as pounding in a mortar. As Component (G), one kind may be used singly or two or more kinds may be used in combination.

A milled carbon fiber is one fabricated by subjecting a carbon fiber to processing such as pounding in a mortar and has a significantly short length of 0.3 mm or less, more preferably 0.1 mm or less.

The milled carbon fiber is dispersed in the gaps between the short fibers, the distribution of the fibers becomes uniform in the entire sheet-shaped molding material, and the surface becomes smooth as such a milled carbon fiber is added.

As a material for realizing such an effect, the milled carbon fiber having a length of 0.3 mm or less enters the gap between the short fibers and the effect is likely to be obtained. The amount of such a milled carbon fiber added is preferably 1 part by weight or more and 10 parts by weight or less and more preferably 2 parts by mass or more and 8 parts by mass or less with respect to the resin. A molded article exhibiting sufficient mechanical strength is obtained when the amount of the milled carbon fiber added is 1 part by weight or more. A molded article having uniform dispersion of the milled carbon fiber and a smooth surface is obtained when the amount of the milled carbon fiber added is 10 parts by weight or less.

(Other Components)

The matrix resin composition may contain components other than Component (A) to Component (H). Examples of other components may include a curing accelerator (provided that a metal chelate compound is excluded), an inorganic filler, an internal mold release agent, a stabilizer (a polymerization inhibitor), a pigment, a colorant, a wet dispersant, and a water absorbing agent.

Examples of the curing accelerator may include metal soaps (cobalt naphthenate, cobalt octylate, zinc octylate, and the like), and amines (aniline, N,N-dimethylaniline, N,N-diethylaniline, pyridine, phenylmorpholine, piperidine, and the like). As the curing accelerator, one kind may be used singly or two or more kinds may be used in combination.

The inorganic filler is not particularly limited, and examples thereof may include calcium carbonate, magnesium carbonate, aluminum hydroxide, magnesium hydroxide, calcium hydroxide, silica, fused silica, barium sulfate, titanium oxide, magnesium oxide, calcium oxide, aluminum oxide, calcium phosphate, talc, mica, clay, and glass powder. As the inorganic filler, one kind may be used singly or two or more kinds may be used in combination.

The internal mold release agent is not particularly limited, and examples thereof may include a fatty acid metal salt such as zinc stearate and a surfactant such as sodium dialkyl sulfosuccinate. As the internal mold release agent, one kind may be used singly or two or more kinds may be used in combination.

(Component (C))

Component (C) is a reinforcing fiber bundle having a fiber length of 5 mm or more and 120 mm or less.

The reinforcing fiber to be used in the reinforcing fiber bundle is not particularly limited, and for example, an inorganic fiber, an organic fiber, a metal fiber, or a reinforcing fiber having a hybrid configuration in which these are combined can be used.

Examples of the inorganic fiber may include a carbon fiber, a graphite fiber, a silicon carbide fiber, an alumina fiber, a tungsten carbide fiber, a boron fiber, and a glass fiber. Examples of the organic fiber may include an aramid fiber, a high-density polyethylene fiber, other general nylon fibers, and a polyester fiber. Examples of the metal fiber may include fibers of stainless steel and iron, and the metal fiber may also be a carbon fiber covered with a metal. Among these, a carbon fiber is preferable in consideration of mechanical properties such as strength of the molded article.

Examples of the carbon fiber may include a polyacrylonitrile (PAN)-based carbon fiber, a rayon-based carbon fiber, and a pitch-based carbon fiber. Among these, a PAN-based carbon fiber is preferable since it exhibits excellent compressive strength.

As Component (C), one kind may be used singly or two or more kinds may be used in combination.

The fiber length of the reinforcing fiber bundle is 5 mm or more and 120 mm or less, preferably 10 mm or more and 80 mm or less, and more preferably 20 mm or more and 60 mm or less. A molded article exhibiting sufficient mechanical strength is obtained when the fiber length of the reinforcing fiber bundle is 5 mm or more. The SMC containing this reinforcing fiber bundle is likely to flow at the time of molding and excellent moldability is obtained when the fiber length of the reinforcing fiber bundle is 120 mm or less.

[Proportion of Each Component]

The proportion of Component (A) with respect to the total mass (100% by mass) of Component (A) and Component (B) (the total mass (100% by mass) of Component (A), Component (B), and Component (H) in the case of using Component (H)) is preferably 40% by mass or more and 90% by mass or less and more preferably 50% by mass or more and 80% by mass or less. A molded product exhibiting high mechanical strength can be obtained when the proportion of Component (A) is 40% by mass or more. The viscosity of the mixture composed of the components other than Component (C) does not increase too high and favorable impregnating property into Component (C) is obtained when the proportion of Component (A) is 90% by mass or less.

The molar ratio of the isocyanate group in Component (D) with respect to the total amount of the hydroxyl groups and carboxyl groups in Component (A) is preferably 1.3 or more and 10 or less and more preferably 2 or more and 8 or less. The effect of thickening the molding material in the SMC manufacturing process is likely to be obtained and the handling property of SMC is improved when the molar ratio is 1.3 or more. It is easy to suppress a decrease in storage stability and moldability due to continuous thickening of the molding material with time when the molar ratio is 10 or less.

The proportion of Component (E) with respect to 100 parts by mass of the sum of Component (A) and Component (B) (100 parts by mass of the sum of Component (A), Component (B), and Component (H) in the case of using Component (H)) is preferably 0.002 part by mass or more and 0.08 part by mass or less, more preferably 0.004 part by mass or more and 0.07 part by mass or less, and still more preferably 0.01 part by mass or more and 0.06 part by mass or less. The effect of suppressing excessive thickening of the molding material with time is sufficiently obtained and a SMC exhibiting sufficiently high flowability at the time of molding is obtained when the proportion is 0.002 part by mass or more. It is possible to suppress continuous excessive thickening of the molding material with time, a decrease in flowability of the SMC to be obtained at the time of molding, and a decrease in the storage stability and moldability in a case in which the proportion is 0.08 part by mass or less as well.

The proportion of Component (E) with respect to 100 parts by mass of Component (D) is preferably 0.005 part by mass or more and 0.500 part by mass or less and more preferably 0.01 part by mass or more and 0.35 part by mass or less.

The amount of Component (F) used is preferably 0.1 part by mass or more and 5 parts by mass or less and more preferably 0.5 part by mass or more and 3 parts by mass or less with respect to 100 parts by mass of Component (A).

The proportion of Component (H) with respect to 100 parts by mass of the sum of Component (A) and Component (B) (100 parts by mass of the sum of Component (A), Component (B), and Component (H) in the case of using Component (H)) is preferably 1 part by mass or more and 50 parts by mass or less and more preferably 2 parts by mass or more and 40 parts by mass or less. Favorable impregnating property into Component (C) is obtained when the proportion of Component (H) is 1 part by mass or more. A molded article exhibiting sufficient mechanical strength is obtained when the proportion of Component (H) is 50 parts by mass or less.

The proportion of the curing accelerator with respect to 100 parts by mass of the sum of Component (A) and Component (B) (100 parts by mass of the sum of Component (A), Component (B), and Component (H) in the case of using Component (H)) is preferably 0.001 part by mass or more and 5 parts by mass or less in the case of using a curing accelerator in the molding material of the invention.

The proportion of Component (C) with respect to 100 parts by mass of the sum of Component (A) and Component (B) (100 parts by mass of the sum of Component (A), Component (B), and Component (H) in the case of using Component (H)) is preferably 20 parts by mass or more and 80 parts by mass or less and more preferably 30 parts by mass or more and 70 parts by mass or less. A molded article exhibiting excellent mechanical strength is likely to be obtained when the proportion of Component (C) is 20 parts by mass or more. The SMC is likely to flow at the time of molding and excellent moldability is likely to be obtained when the proportion of Component (C) is 80 parts by mass or less.

[SMC and Method of Manufacturing the Same]

The SMC according to the invention is obtained by thickening the matrix resin composition contained in the molding material of the invention. In other words, it is a SMC containing a thickened product of the matrix resin composition and Component (C) described above.

The method of manufacturing the SMC is not particularly limited, and examples thereof may include the following method.

First, Component (A), Component (B), Component (D) and Component (E) and Component (F), Component (G), Component (H) and other components to be used if necessary are mixed together to obtain a matrix resin composition. Subsequently, the matrix resin composition is impregnated into a sheet-shaped material in which the reinforcing fiber bundle which is Component (C) is randomly deposited in two dimensions by using a known apparatus and then the matrix resin composition is thickened by performing aging at a temperature of from 10° C. to 50° C. for several days, whereby a SMC is manufactured.

The basis weight of the reinforcing fiber bundle which is Component (C) in the SMC is preferably 50 g/m$^2$ or more and 4,000 g/m$^2$ or less, more preferably 100 g/m$^2$ or more and 3,000 g/m$^2$ or less, and still more preferably 200 g/m$^2$ or more and 2,000 g/m$^2$ or less. A molded article which is more uniform and exhibits high physical properties can be obtained when the basis weight of the reinforcing fiber bundle is 50 g/m$^2$ or more and 4,000 g/m$^2$ or less. In particular, it is preferable that the basis weight of the reinforcing fiber bundle is 200 g/m$^2$ or more since the elastic modulus of the fiber-reinforced composite material to be obtained using the SMC becomes higher.

The viscosity of SMC at 25° C. is preferably 5,000 Pa·s or more and 100,000 Pa·s or less and more preferably 8,000 Pa·s or more and 80,000 Pa·s or less. Incidentally, the viscosity in the invention means a value to be measured by using a Brookfield viscometer such as a digital viscometer HB DV-I Prime manufactured by BROOKFIELD ENGINEERING LABORATORIES, INC.

In the molding material of the invention described above, a metal chelate compound which is Component (E) is contained at a particular ratio and thus excessive thickening of the matrix resin composition with time is suppressed while sufficient initial thickening by an isocyanate-based thickener is maintained. In addition, a decrease in flowability of the SMC to be obtained at the time of molding is greatly suppressed particularly in a case in which the molding material contains an aromatic vinyl compound which is Component (B), and particularly in a case in which styrene is contained as Component (B) among these. Hence, the SMC of the invention exhibits excellent storage stability and moldability.

Incidentally, in conventional SMCs as described in Patent Literatures 1 to 6, there is a case in which a metal chelate compound is blended as a curing accelerator at about 0.001 part by mass or more and 5 parts by mass or less with respect to 100 parts by mass of the curable compound. However, there is a case in which then effect of suppressing excessive thickening of the matrix resin composition with time in the case of using an isocyanate-based thickener and the effect of suppressing a decrease in flowability of the SMC to be obtained at the time of molding are not sufficiently obtained when the metal chelate compound is blended at such a proportion. As described above, in the invention, heterogeneous effects of suppressing excessive thickening of the matrix resin composition with time in the case of using an isocyanate-based thickener and suppressing a decrease in flowability of the SMC to be obtained at the time of molding are obtained by limiting the proportion of Component (E) blended to a particular proportion to be a smaller amount in the range of the amount of a metal chelate compound blended as a conventional curing accelerator.

[Fiber-Reinforced Composite Material]

The fiber-reinforced composite material of the invention is a molded article (fiber-reinforced composite material) containing a cured product of the SMC of the invention. The aspect of the fiber-reinforced composite material of the invention is not particularly limited except that the SMC of the invention is used.

The fiber-reinforced composite material of the invention may be a fiber-reinforced composite material fabricated using the SMC of the invention in combination with known materials such as a prepreg and a nonwoven fabric other than the SMC. The fiber-reinforced composite material of the invention may be, for example, a molded article which is formed on a flat plate portion formed using a prepreg laminate in which a plurality of known sheet-shaped prepregs are laminated using the SMC of the invention and equipped with convex portions such as ribs and bosses.

The fiber-reinforced composite material of the invention described above is easily molded since a SMC of which excessive thickening with time is suppressed while of which initial thickening by an isocyanate-based thickener and the curability at the time of molding are maintained, of which a decrease in flowability at the time of molding is suppressed, and which exhibits excellent storage stability and moldability is used therein.

EXAMPLES

Hereinafter, the invention will be described in detail with reference to Examples, but the invention is not limited by the description below.

[Raw Materials Used]

The raw materials used are presented below.

(Component (A) and Mixture of Component (A) and Component (B))

PEs-1: A mixture of a condensate of 2,6-naphthalenedicarboxylic acid, fumaric acid, 1,3-propanediol and ethylene glycol, which is Component (A) and styrene which is Component (B). The mass ratio is Component (A)/Component (B)=70/30.

PEs-2: A mixture of a condensate of terephthalic acid, maleic acid, 1,3-propanediol and propylene glycol, which is Component (A) and styrene which is Component (B). The mass ratio is Component (A)/Component (B)=70/30.

EM-1: "EPDXY ESTER 3000M" (trade name, manufactured by Kyoeisha Chemical Co., Ltd., methacrylic acid adduct of bisphenol A diglycidyl ether)

EM-2: "EPDXY ESTER 3002M" (trade name, manufactured by Kyoeisha Chemical Co., Ltd., methacrylic acid adduct of bisphenol A propylene glycol adduct diglycidyl ether)

EM-3: "NEOPOL 8051" (trade name, manufactured by Japan U-Pica Company Ltd., a mixture of epoxy acrylate which is Component (A) and styrene which is Component (B), and the mass ratio is Component (A)/Component (B)=68/32)

(Component (B))

St: Styrene (Component (C))

CF-C: One obtained by cutting "TR50S 15L" (trade name: manufactured by Mitsubishi Rayon Co., Ltd., carbon fiber bundle having filament number of 15000) to have a length of 25 mm.

(Component (D))

NCO: "COSMONATE LL" (trade name, manufactured by Mitsui Chemicals, Inc., isocyanate group-terminated urethane resin (methylene bis(4,1-phenylene) diisocyanate/polyisocyanate compound/tributyl phosphate (mass ratio) =74/24/1.2)

(Component (E))

E-1: Iron(III) acetylacetonate (manufactured by Sigma-Aldrich, Inc., 99.9%.)

E-2: Titanium(IV) acetylacetonate (manufactured by Tokyo Chemical Industry Co., Ltd., 63% by mass isopropyl alcohol solution of tetrakis(2,4-pentanedionato)titanium (IV))

(Component (F))

F: 75% by mass solution of 1,1-di(t-butylperoxy)cyclohexane (manufactured by NOF CORPORATION, product name: PERHEXA C-75 (EB)).

(Component (G))

Milled Carbon Fiber

G: milled carbon fiber having average fiber length of 40 μm (manufactured by Nippon Polymer Sangyo Co., Ltd., product name: CFMP-30X)

(Component (H))

H: Phenyl methacrylate (manufactured by Mitsubishi Chemical Corporation, product name: Acrylic Ester PH)

Example 1

(Preparation of Matrix Resin Composition)

A matrix resin composition was obtained by thoroughly mixing and stirring PEs-1, F as a polymerization initiator which was Component (F), NCO as Component (D), and E-1 as Component (E) which were presented in Table 1 at 100 parts by mass (70 parts by mass of Component (A1) and 30 parts by mass of Component (B)), 1.0 part by mass, 10 parts by mass, and 0.005 part by mass, respectively.

The storage stability of SMC to be obtained using the matrix resin composition was evaluated according to the [Evaluation on Storage Stability] to be described below using the matrix resin composition obtained. The results are presented in Table 1.

(Manufacturing SMC)

The matrix resin composition obtained was coated on a polyethylene carrier film so as to have a thickness of 1.0 mm by using a doctor blade, and CF-C as Component (C) was sprayed on this so that the basis weight of the carbon fiber bundle became substantially uniform and the directions of the carbon fibers were random. Another polyethylene carrier film coated with the same matrix resin composition so as to have a thickness of 1.0 mm was laminated on this so that the matrix resin composition sides faced each other. This was pressed by being allowed to pass through the rolls and the matrix resin composition was thus impregnated into the carbon fiber bundle, thereby obtaining an SMC precursor (molding material). The SMC precursor obtained was allowed to still stand at room temperature (23° C.) for 72 hours to sufficiently thicken the matrix resin composition in the SMC precursor, thereby obtaining a SMC. The content rate of the carbon fiber in the SMC obtained was 50% by mass, and the basis weight was 3,000±300 g/m².

The flowability was evaluated using the SMC obtained. The results are presented in Table 1.

Examples 2 to 7 and Comparative Examples 1 to 3

Matrix resin compositions were prepared in the same manner as in Example 1 except that the respective components presented in Table 1 were used, and the evaluation on storage stability of SMC was performed using these. The results are presented in Table 1.

In addition, SMCs were fabricated in the same manner as in Example 1 using the matrix resin compositions obtained.

[Evaluation on Storage Stability]

The storage stability of SMC was evaluated by the viscosity measurement of the matrix resin composition which did not contain Component (C). It is possible to evaluate the storage stability of SMC by the viscosity measurement of the matrix resin composition since the storage stability is hardly affected by the presence or absence of Component (C).

Specifically, in each example, the matrix resin composition after being prepared was allowed to still stand at 25° C., the viscosity of the matrix resin composition in 7 days and 70 days after the preparation was measured by using a viscometer manufactured by BROOKFIELD ENGINEERING LABORATORIES, INC., and the storage stability of SMC was evaluated according to the following criteria.

(Evaluation Criteria)

A: Viscosity after 70 days is less than $4 \times 10^4$ Pa·s.

B: Viscosity after 70 days is $4 \times 10^4$ Pa·s or more and less than $10 \times 10^4$ Pa·s.

C: Viscosity after 70 days is $10 \times 10^4$ Pa·s or more.

[Evaluation on Flowability]

The flowability at the time of press molding was evaluated using one (Sample 1) obtained by storing the SMC obtained in each example at 25° C. for 7 days and one (Sample 2) obtained by storing the SMC at 25° C. for 70 days.

One sheet of Sample 1 was charged at the center of a 300 mm square die for flat plate molding and heated and compressed for 5 minutes under a condition of a die temperature of 150° C. and a pressure of 720 kN to be cured, thereby obtaining a 300 mm square fiber-reinforced composite material (CFRP molded plate) having a thickness of about 1 mm and a flat plate shape. A 300 mm square fiber-reinforced composite material (CFRP molded plate) having a flat plate shape was obtained using Sample 2 in the same manner.

The change in flowability of SMC was evaluated from the ratio of the charge rate of SMC (the proportion of the SMC area in contact with the die with respect to the die area) required to obtain an intended CFRP molded plate under this molding condition.

(Evaluation Criteria)

A: Ratio of charge rate of Sample 2 to charge rate of Sample 1 is 100%.

B: Ratio of charge rate of Sample 2 to charge rate of Sample 1 exceeds 100% and is 115% or less.

C: Ratio of charge rate of Sample 2 to charge rate of Sample 1 exceeds 115%.

D: Charge rate of Sample 1 exceeds 60% of die area.

The composition and evaluation results of each example are presented in Table 1.

Incidentally, the net amount of tetrakis(2,4-pentanedionato)titanium(IV) blended is presented in the column for E-2 in Table 1. In addition, "E/D" means the proportion of Component (E) with respect to 100 parts by mass of Component (D). In addition, "E/(A+B)" means the proportion of Component (E) with respect to 100 parts by mass of the sum of Component (A) and Component (B).

TABLE 1

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Component (A) or mixture of (A) and (B) [parts by mass] | PEs-1 | 70 | — | — | — | — | — | 28 | — | — | — |
| | PEs-2 | 30 | — | — | — | — | — | 12 | — | — | — |
| | EM-1 | — | 70 | — | — | — | — | — | — | — | — |
| | EM-2 | — | 30 | — | — | — | — | — | — | 63 | — |
| | EM-2 | — | — | 70 | 70 | — | — | 42 | 68 | 27 | 70 |
| | EM-3 | — | — | — | — | 68 | 68 | — | 32 | — | — |
| Component (B) [parts by mass] | St | — | — | 30 | 30 | 32 | 32 | 18 | — | 10 | 30 |
| Component (C) [parts by mass] | CF-C | 100 | 100 | 100 | 100 | 100 | 100 | 100 | 100 | 100 | 100 |
| Component (D) [parts by mass] | NCO | 10 | 10 | 40 | 40 | 15 | 15 | 20 | 15 | 15 | 40 |
| Component (E) [parts by mass] | E-1 | 0.050 | 0.050 | 0.050 | 0.050 | 0.050 | — | 0.020 | — | 0.001 | 0.100 |
| | E-2 | — | — | — | — | — | 0.050 | — | — | — | — |
| Component (F) [parts by mass] | F | 1 | 1 | 1 | 1 | 1 | 1 | 1 | 1 | 1 | 1 |
| | E/D [parts try mass] | 0.500 | 0.500 | 0.125 | 0.125 | 0.333 | 0.333 | 0.100 | — | 0.007 | 0.250 |
| | E/(A + B) [parts by mass] | 0.050 | 0.050 | 0.050 | 0.050 | 0.050 | 0.050 | 0.020 | — | 0.001 | 0.100 |
| Storage stability | Viscosity (×10⁴) [Pa·s] Sample 1 | 2.0 | 2.0 | 2.0 | 2.0 | 2.0 | 2.0 | 2.0 | 2.0 | 2.0 | 2.0 |
| | After 7 days Sample 2 | 4.0 | 4.0 | 4.0 | 4.0 | 4.0 | 6.0 | 3.0 | 10.0 | 10.0 | Unmeasurable |
| | After 70 days Determination | B | B | B | B | B | B | A | C | C | C |
| Flowability | Charge size Sample 1 | 220 mm square | 220 mm square | 220 mm square | 220 mm square | 220 mm square | 220 mm square | 220 mm square | 220 mm square | 220 mm square | 240 mm square |
| | Sample 2 | 225 mm square | 225 mm square | 225 mm square | 225 mm square | 225 mm square | 225 mm square | 220 mm square | 240 mm square | 240 mm square | — |
| | Charge rate Sample 1 | 53.8% | 53.8% | 53.8% | 53.8% | 53.8% | 53.8% | 53.8% | 53.8% | 53.8% | — |
| | Ratio of Sample 2/Sample 1 charge rate | 104.6% | 104.6% | 104.6% | 104.6% | 104.6% | 109.3% | 100.0% | 119.0% | 119.0% | 64.0% |
| | Determination | B | B | B | B | B | B | A | c | c | D |

As presented in Table 1, in Examples 1 to 7 in which Component (E) was blended at the proportion regulated in the invention, excessive thickening of SMC with time was suppressed as the viscosity of the matrix resin composition in 70 days after the preparation was lower than those of Comparative Example 2 in which the proportion of Component (E) was too small, Comparative Example 3 in which the proportion of Component (E) was too great, and Comparative Example 1 in which Component (E) was not contained. In addition, the SMCs of Examples 1 to 7 exhibited higher flowability than the SMCs of Comparative Examples 1 to 3.

The invention claimed is:

1. A molding material comprising:
   a matrix resin composition comprising the following component (A), the following component (B), the following component (D) and the following component (E); and
   the following component (C),
   wherein
   a proportion of the component (E) with respect to 100 parts by mass of a sum of the component (A) and the component (B) is from 0.002 part by mass to 0.08 part by mass:
   the component (A) comprises at least one compound comprising a hydroxyl group, a carboxyl group, or a combination thereof and a polymerizable unsaturated group,
   the component (B) comprises an aromatic vinyl compound,
   the component (C) comprises a reinforcing fiber bundle having a fiber length of from 5 mm to 120 mm,
   the component (D) comprises an isocyanate compound, and
   the component (E) comprises a metal chelate compound.

2. The molding material according to claim 1, wherein the component (B) comprises styrene.

3. The molding material according to claim 1, wherein the component (A) comprises an unsaturated polyester comprising a hydroxyl group, a carboxyl group, or a combination thereof and a polymerizable unsaturated group, or an epoxy (methy)acrylate comprising a hydroxyl group, a carboxyl group, or a combination thereof and a polymerizable unsaturated group.

4. The molding material according to claim 1, wherein the component (A) comprises an unsaturated polyester comprising a hydroxyl group, a carboxyl group, or a combination thereof and a polymerizable unsaturated group, or an epoxy (methy)acrylate comprising a hydroxyl group, a carboxyl group, or a combination thereof and a polymerizable unsaturated group.

5. The molding material according to claim 1, wherein the component (C) comprises a carbon fiber bundle.

6. The molding material according to claim 1, wherein the component (E) comprises at least one metal chelate compound selected from the group consisting of a titanium chelate compound, a manganese chelate compound, an iron chelate compound, a nickel chelate compound, a copper chelate compound, a zirconium chelate compound, a tin chelate compound, and a bismuth chelate compound.

7. The molding material according to claim 1, wherein the component (E) comprises an iron chelate compound or a titanium chelate compound.

8. The molding material according to claim 7, wherein the iron chelate compound comprises iron(III) acetylacetonate.

9. The molding material according to claim 1, further comprising a polymerization initiator as a component (F).

10. The molding material according to claim 1, wherein the component (D) comprises at least one selected from the group consisting of methyl isocyanate, 2,4-toluene diisocyanate, 2,6-toluene diisocyanate, 4,4'-diphenylmethane diisocyanate (MDI), isophorone diisocyanate (IPDI), hexamethylene diisocyanate (HDI), tolylene diisocyanate, xylene diisocyanate, and tetramethylxylylene diisocyanate.

11. The molding material according to claim 1, wherein the component (D) comprises an isocyanate prepolymer.

12. The molding material according to claim 1, wherein the component (D) comprises carbodiimide-modified MDI.

13. A method of production of the molding material according to claim 1, the method comprising:
   preparing a matrix resin composition by mixing components comprising the component (A), the component (B), the component (D) and the component (E); and
   impregnating the component (C) with the matrix resin composition.

14. A sheet molding compound comprising: a thickened product of a matrix resin composition comprising the following component (A), the following component (B), the following component (D) and the following component (E); and
   the following component (C),
   wherein
   a proportion of the component (E) with respect to 100 parts by mass of a sum of the component (A) and the component (B) is from 0.002 part by mass to 0.08 part by mass:
   the component (A) comprise at least one compound having a hydroxyl group, a carboxyl group and a polymerizable unsaturated group, or combination thereof,
   the component (B) comprises an aromatic vinyl compound,
   the component (C) comprises a reinforcing fiber bundle having a fiber length of from 5 mm to 120 mm,
   the component (D) comprises an isocyanate compound, and
   the component (E) comprises a metal chelate compound.

15. A fiber-reinforced composite material comprising a cured product of the sheet molding compound of claim 14.

16. The sheet molding compound according to claim 14, wherein the component (D) comprises at least one selected from the group consisting of methyl isocyanate, 2,4-toluene diisocyanate, 2,6-toluene diisocyanate, 4,4'-diphenylmethane diisocyanate (MDI), isophorone diisocyanate (IPDI), hexamethylene diisocyanate (HDI), tolylene diisocyanate, xylene diisocyanate, and tetramethylxylylene diisocyanate.

17. The sheet molding compound according to claim 14, wherein the component (D) comprises an isocyanate prepolymer.

18. The sheet molding compound according to claim 14, wherein the component (D) comprises carbodiimide-modified MDI.

19. A method of production of a sheet molding material according to claim 14, the method comprising:
   preparing a matrix resin composition by mixing components comprising the component (A), the component (B), the component (D) and the component (E);
   impregnating the component (C) with the matrix resin composition; and
   thickening the matrix resin composition after the impregnating.

20. A method of production a fiber-reinforced composite material, the method comprising:

curing the sheet molding compound according to claim 14.

\* \* \* \* \*